United States Patent
Gardner et al.

(10) Patent No.: US 9,860,072 B2
(45) Date of Patent: Jan. 2, 2018

(54) SYSTEM WITH SLEEP AND WAKE UP CONTROL OVER DC PATH

(71) Applicant: Linear Technology Corporation, Milpitas, CA (US)

(72) Inventors: Andrew J. Gardner, Santa Barbara, CA (US); David M. Dwelley, Santa Barbara, CA (US); Heath Stewart, Santa Barbara, CA (US)

(73) Assignee: Linear Technology Corporation, Milpitas, CA (US)

( * ) Notice: Subject to any disclaimer, the term of this patent is extended or adjusted under 35 U.S.C. 154(b) by 12 days.

(21) Appl. No.: 15/134,117

(22) Filed: Apr. 20, 2016

(65) Prior Publication Data

US 2016/0337138 A1    Nov. 17, 2016

Related U.S. Application Data

(60) Provisional application No. 62/160,369, filed on May 12, 2015.

(51) Int. Cl.

| | |
|---|---|
| H02J 1/00 | (2006.01) |
| H02J 3/00 | (2006.01) |
| H04B 3/54 | (2006.01) |
| H04L 12/10 | (2006.01) |
| H04L 12/12 | (2006.01) |
| H04L 12/403 | (2006.01) |

(52) U.S. Cl.
CPC .............. *H04L 12/10* (2013.01); *H04L 12/12* (2013.01); *H04L 12/403* (2013.01); *Y02B 60/34* (2013.01)

(58) Field of Classification Search
USPC ........................................ 307/1; 398/66, 166
See application file for complete search history.

(56) References Cited

U.S. PATENT DOCUMENTS

| | | | | |
|---|---|---|---|---|
| 9,319,101 | B2* | 4/2016 | Lontka | H04B 3/46 |
| 9,647,773 | B2* | 5/2017 | Soto | H04B 10/808 |
| 2005/0160301 | A1 | 7/2005 | Disser | |
| 2010/0150556 | A1* | 6/2010 | Soto | H04B 10/808 |
| | | | | 398/66 |

(Continued)

FOREIGN PATENT DOCUMENTS

DE    102011089412 A1    6/2013

OTHER PUBLICATIONS

EP Application No. 16001081.5, "Extended EP Search Report", 16 pages.

*Primary Examiner* — Adam Houston
(74) *Attorney, Agent, or Firm* — Patent Law Group LLP; Brian D. Ogonowsky

(57) ABSTRACT

A system includes a master and a slave coupled via a wire pair for transmitting differential data. The master and slave are each powered by a local DC power supply. In a normal mode, a DC voltage and differential data are supplied over the same wire pair. The differential data is processed by a PHY AC-coupled to the wire pair. To enter a low power sleep mode, such as due to a temporary non-use of the system, the master interrupts the DC voltage on the wire pair, which signals to the slave to enter the sleep mode. The system is woken up by reapplying the DC voltage to the wire pair to signal to the slave to wake up. Only the DC path, and not the data path, is used for signaling the sleep mode and awake mode, so the data path can be disabled to conserve power.

16 Claims, 5 Drawing Sheets

(56) References Cited

U.S. PATENT DOCUMENTS

| | | | |
|---|---|---|---|
| 2013/0111245 A1* | 5/2013 | Giat | H04L 12/4625 713/323 |
| 2013/0169421 A1* | 7/2013 | Murase | G08C 19/12 340/13.23 |
| 2013/0275784 A1 | 10/2013 | Doring et al. | |
| 2013/0315080 A1* | 11/2013 | Diab | H04L 12/12 370/252 |
| 2014/0219247 A1* | 8/2014 | Lee | H04W 76/026 370/331 |
| 2014/0314412 A1* | 10/2014 | Soto | H04L 12/2898 398/67 |
| 2015/0078756 A1* | 3/2015 | Soto | H04B 10/808 398/116 |
| 2016/0034416 A1* | 2/2016 | Chavez | G06F 13/4282 381/59 |
| 2016/0054777 A1* | 2/2016 | Dwelley | G06F 1/3206 710/110 |
| 2016/0337138 A1* | 11/2016 | Gardner | H04L 12/10 |
| 2017/0091198 A1* | 3/2017 | Zhang | G06F 17/3064 |
| 2017/0220502 A1* | 8/2017 | Kessler | G06F 13/36 |
| 2017/0222790 A1* | 8/2017 | Hooper | H04L 7/0016 |
| 2017/0222829 A1* | 8/2017 | Kessler | H04B 3/54 |
| 2017/0237506 A1* | 8/2017 | Soto | H04B 10/808 398/116 |

* cited by examiner

SYSTEM WITH SLEEP AND WAKE UP CONTROL OVER DC PATH

CROSS-REFERENCE TO RELATED APPLICATIONS

This application claims priority to U.S. provisional application Ser. No. 62/160,369, filed May 12, 2015, by Andrew J. Gardner et al, assigned to the present assignee and incorporated by reference.

FIELD OF THE INVENTION

This invention relates to systems where DC power and data are transmitted from one piece of data terminal equipment to another via a twisted wire pair. The invention more particularly relates to techniques for putting the system into a low power sleep mode and waking the system up from the sleep mode even if the data path physical layer has been disabled during the sleep mode.

BACKGROUND

In a Power over Data Lines (PoDL) system, DC power from Power Sourcing Equipment (PSE) is transmitted over a single twisted wire pair to a Powered Device (PD) after the system goes through a powering up routine, referred to as a detection and classification routine, that indicates that the PD is PoDL compatible. The same twisted wire pair also transmits/receives differential data signals, typically in accordance with the Ethernet protocols. A DC coupling network couples DC to the wire pair, and an AC coupling network couples the differential data to the wire pair. DC and AC decoupling networks decouple the DC power and AC data from the wire pair. In this way, the need for providing any external power source for the PD can be eliminated. The standards for PoDL are set out in IEEE 802.3 and are well-known.

In a PoDL system, the units coupled to the wire pair are sometimes referred to as a master and a slave (rather than a PSE and a PD), since either unit may control the other. The master may sometimes act as a slave. In some of the examples below, one unit is designated as a master and the other unit is designated as a slave; however, the designations may be reversed depending on the function being performed.

FIG. 1 illustrates conventional PoDL system including AC/DC coupling/decoupling networks (C1-C4, L1-L4) between a PSE 10 and a PD 12. The PSE 10 includes a DC voltage source 13 and a differential data portion whose interface to the wire pair 16 is identified as a physical layer (PHY) 17. The PHY 17 may include transceivers and other circuitry for processing the data in accordance with the IEEE standards. The PD 12 has a similar PHY 18. The details of the data portion of the PoDL system are not particularly relevant to the present invention.

Other types of systems (non-PoDL systems) include a DC power source at both end terminals, so PoDL is not required for normal operation. Data is transmitted over a twisted wire pair between the two terminals.

In some applications, it is desired for the system to enter a low power sleep mode (or standby mode) after being initially powered up, where power is removed from certain circuitry to conserve power. This may be done by a master or slave issuing a sleep mode code, using the differential data path (the twisted wire pair), and the processors in the master and slave then controlling the circuits to go into a low power mode. However, the PHYs must remain powered to receive a wake-up signal over the data path. The PHYs consume power in the sleep mode, which may be undesirable if very low power consumption is needed.

What is needed is a technique for allowing the PHYs to also be disabled in a sleep mode and allowing the PHYs to be woken up without using the data path.

SUMMARY

In a system using a twisted wire pair to communicate differential data between two end terminals, a sleep mode signal and a wake up signal are transmitted between a master and a slave in a non-PoDL system (both ends have a DC power supply) solely using a DC path. Therefore, since the data path is not needed, the PHYs can be disabled during the sleep mode along with any other data processing circuitry to conserve power. This is particularly valuable where the power supply is a battery.

In one embodiment, either of the units coupled to the wire pair can be a master or a slave, and the units are symmetrical. The designation in the examples is arbitrary. The master and slave each include a DC voltage transmitter and a DC voltage receiver. During normal operation, the master and slave may each be powered by their own local power supply.

Either the master or the slave is capable of coupling a DC voltage to the twisted wire pair. The DC voltage is supplied to the wire pair by the transmitter in the master. The output of the transmitter while supplying the DC voltage is a low impedance resulting from the transmitter being in an ON state, which is referred to as a dominant state. This dominant state represents a logical low signal. The slave, during this normal operation, detects the DC voltage from the wire pair.

In one embodiment, the master and slave both include a transmitter and receiver, independent from the data path, coupled to the wire pair. A microcontroller is coupled to the transmitter and receiver in the master and slave.

Sleep mode may be initiated after a period of non-use. When a sleep mode is to be initiated by the master, the master's microcontroller controls the master's transmitter to switch to a high impedance output (a recessive state). When the slave enters sleep mode, the slave's microcontroller controls the slave transmitter to switch to a high impedance state causing the wire pair to be at 0 volts. The mutual termination of DC voltage by both the master and the slave causes both microcontrollers to disable their PHY for the data path and any other unnecessary circuitry in order to conserve power.

If the master microcontroller later issues a wake up signal, the master transmitter switches to its dominant state to couple a DC voltage to the wire pair, and this DC voltage is detected by both the slave receiver and the master receiver. The slave receiver, upon detecting the DC voltage, outputs a wake up signal to the slave microcontroller, and the slave microcontroller responds by enabling the slave PHY. Similarly, the master receiver may output a wake up signal to the master microcontroller in response to a wakeup DC voltage transmitted from the slave, and the master microcontroller may then enable the master PHY. The system is then able to operate normally.

The DC voltage on the wire pair does not affect any data reception since the PHYs may be coupled to the wire pair using AC-coupling capacitors, and the DC voltage is common mode so does not affect the detection of the differential data by the PHYs.

In other embodiments, the sleep mode may be signaled by multiple DC pulses (creating a code) on the wire pair.

If one of the transmitters is in a dominant state and the other transmitter is in a recessive state, the contention is resolved in favor of the dominant state.

Thus, the signaling for indicating a sleep mode and wake up is solely via the DC path, so the data path may be shut down during the sleep mode. This technique can be applied to PoDL systems, where a PSE always powers the PD by a DC voltage via the same wire pair used to conduct data, or to non-PoDL systems, where both terminals have their own DC power supply.

BRIEF DESCRIPTION OF THE DRAWINGS

Elements that are the same or equivalent are labeled with the same numeral.

DETAILED DESCRIPTION

Figure 1:
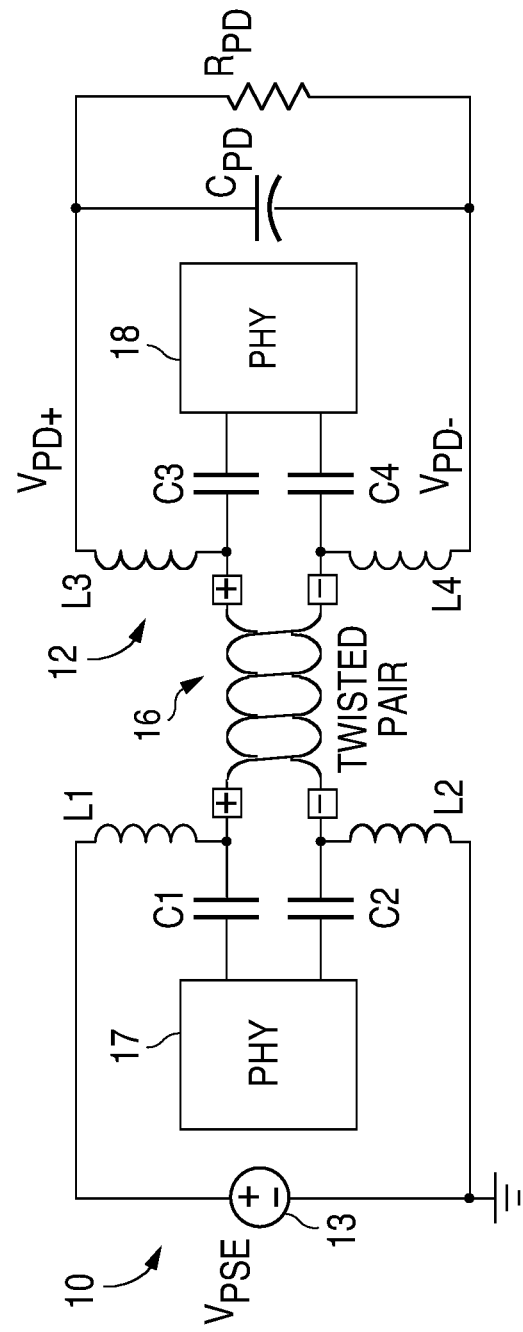
FIG. 1 illustrates a conventional PoDL Ethernet system using a single wire pair for supplying power and data to the PD.
Figure 2:
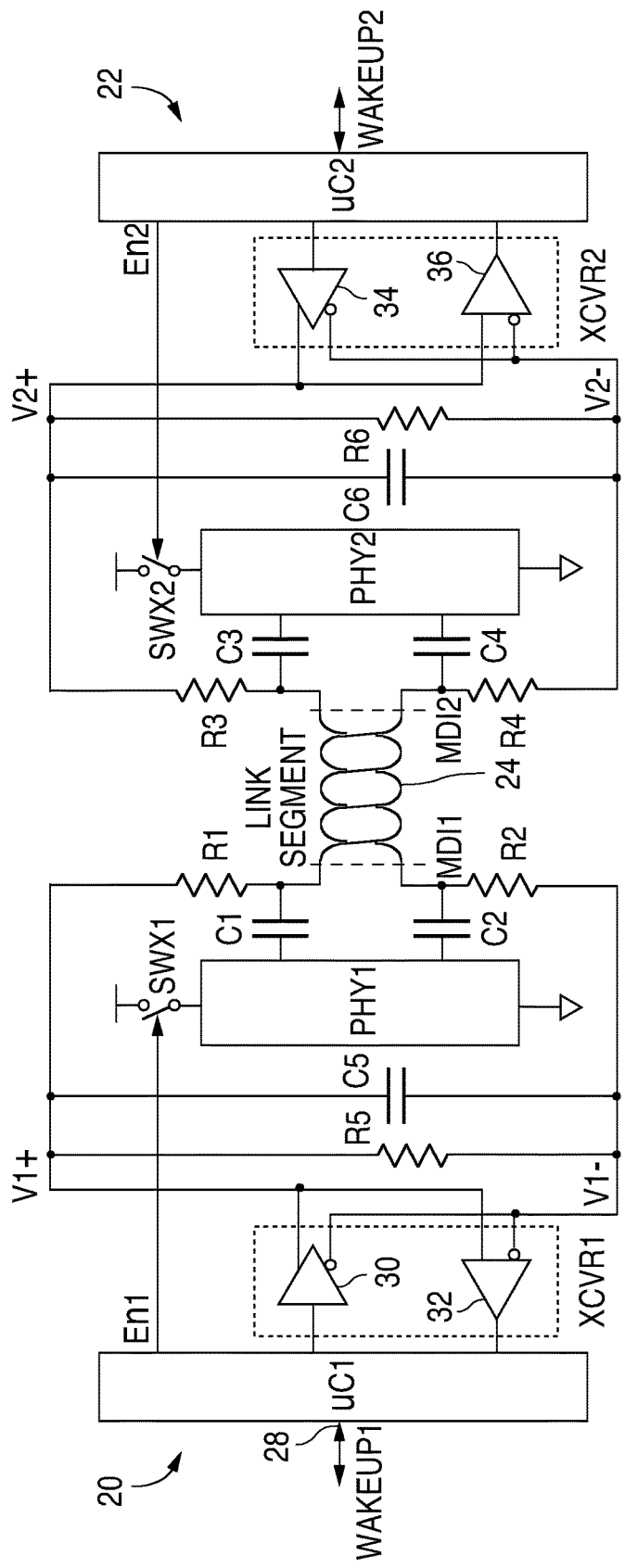
FIG. 2 illustrates a system, in accordance with one embodiment of the invention, where DC signaling using only the DC path is used to put the system in a sleep mode and wake the system from the sleep mode.

FIG. 2 illustrates one embodiment of a system in accordance with the present invention.

A master 20 and a slave 22 are shown coupled to a twisted wire pair 24. The designation of master and slave is arbitrary since either can be the master. In one embodiment, the master 20 includes an electronic control unit in an automobile, and the slave is a sensor or an accessory in the automobile. It is assumed that the master 20 and slave 22 are each coupled to a DC power supply (not shown) through a connection external to the wire pair 24. The wire pair 24 carries differential data (an AC signal). The capacitors C1-C4 only pass the AC data signal to the PHY1 or the PHY2 physical layers, which interface the wire pair to the data processing circuitry of the master 20 and slave 22. Such PHY circuitry may include transceivers, conditioning circuits, etc.

The master 20 includes a microcontroller uC1 that receives a sleep mode initiation signal or a wake up initiation signal at its input/output terminal 28. One output of the microcontroller uC1 controls the state of a transmitter 30 in a transceiver XCVR1, where the transmitter 30 has power input terminals coupled to a locally generated DC voltage, and where the transmitter 30 is controlled to provide the DC voltages V1+ and V1− at its output terminals. Another input into the microcontroller uC1 is the output of receiver 32. Another output of the microcontroller uC1 controls a power switch SWX1 for the physical layer PHY1 portion of the data path. When the PHY1 is to be enabled, the En1 signal is asserted to close the switch SWX1. The En1 signal may shut down and enable other circuitry in the master 20 for conserving power; however, the present invention is directed to the control of the PHY1.

The slave 22 contains symmetrical circuitry including a transceiver XCVR2 comprising a transmitter 34 and a receiver 36 coupled to the slave microcontroller uC2. The transmitter 34 is controlled to provide the DC voltages V2+ and V2− at its output terminals. The microcontroller uC2 controls a switch SWX2 to enable or disable the physical layer PHY2 for the slave's data path.

The differential transceivers XCVR1 and XCVR2 are DC-coupled to the wire pair 24 via resistors R1-R2 and R3-R4, respectively. The DC coupling resistor values are constrained by the Ethernet PHYs' medium dependent interface (MDI) return loss (RL) requirement. MDI RL is defined as:

$$MDI\ RL = 20 \times \log_{10}\left(\left|\frac{100\Omega - Z_{MDI}}{100\Omega + Z_{MDI}}\right|\right)$$

where $Z_{MDI}$ is the impedance looking into either MDI1 or MDI2 from the wire pair 24. A typical requirement for MDI RL may be for a loss of −20 dB or more which yields a minimum value for R1-R4 of ~250Ω. A value significantly greater than 250Ω may be chosen for R1-R4 in order to provide margin against the MDI RL limit. Resistors R5-R6 discharge the outputs of the transceivers XCVR1 and XCVR2 during the recessive state, respectively, and have values much greater than R1-R4. Capacitors C5-C6 in conjunction with resistors R1-R2 and R3-R4, respectively, filter the AC signal resulting from the Ethernet PHYs operation.

During normal operation, when the system is "awake," the master microcontroller uC1 may control its transmitter 30 to be in its dominant state, and the slave microcontroller uC2 may control its transmitter 34 to be in the recessive state. The master 20 and slave 22 are powered by their local DC power supplies. The transmitter 30 in its dominant state has a low impedance and provides the voltages V1+ and V1− on the wire pair 24, shown in FIG. 2. This control signal to the transmitter 30 is arbitrarily designated as a low logic level signal. The microcontroller uC1 also closes the switch SWX1 via the signal En1 to supply power to the physical layer PHY1 for the data path, thus enabling the PHY1. Concurrently, the slave's receiver 36 detects the DC voltage differential across the wire pair 24 and outputs a control signal to the slave microcontroller uC2 indicating that the slave is receiving the master's dominant voltage. The microcontroller uC2 enables the physical layer PHY2 for the data path by closing the switch SWX2 via the signal En2 to supply power to the PHY2. Data may then be transmitted and received between master 20 and slave 22 via the PHY1 and PHY2.

A sleep signal can be initiated in any number of ways, such as by a timer, non-use of the system, user control, detecting a load current is below a threshold level, etc. In one embodiment, a sleep signal is applied to the master microcontroller uC1, or is initiated by the master microcontroller uC1. The microcontroller uC1 then controls the transmitter 30 to go into a high impedance recessive state, where the DC voltage V1+ and V1− is no longer coupled to the wire pair 24. The shunt resistors R5 and R6 discharge the capacitors C5 and C6 and wire pair 24 so that, after a brief period, the voltage across the wire pair 24 is zero volts. The receivers 32 and 36 detect the zero volt differential and output a logic high signal. The outputs of the receivers 32 and 36 are sensed by the respective microcontrollers uC1 and uC2. The slave microcontroller uC2 then removes the asserted En2 signal, which causes the switch SWX2 (e.g., a transistor) to open (e.g., turn off), disabling the physical layer PHY2 for the data path to conserve power. Similarly, the master microcontroller uC1 then removes the asserted En1 signal, which causes the switch SWX1 to open, disabling the physical layer PHY1 for the data path to conserve power.

At this stage in the sleep mode, both transceivers XCVR1 and XCVR2 are in their recessive states (e.g., high impedance open circuits) and both physical layers PHY1 and PHY2 are disabled.

Figure 3:
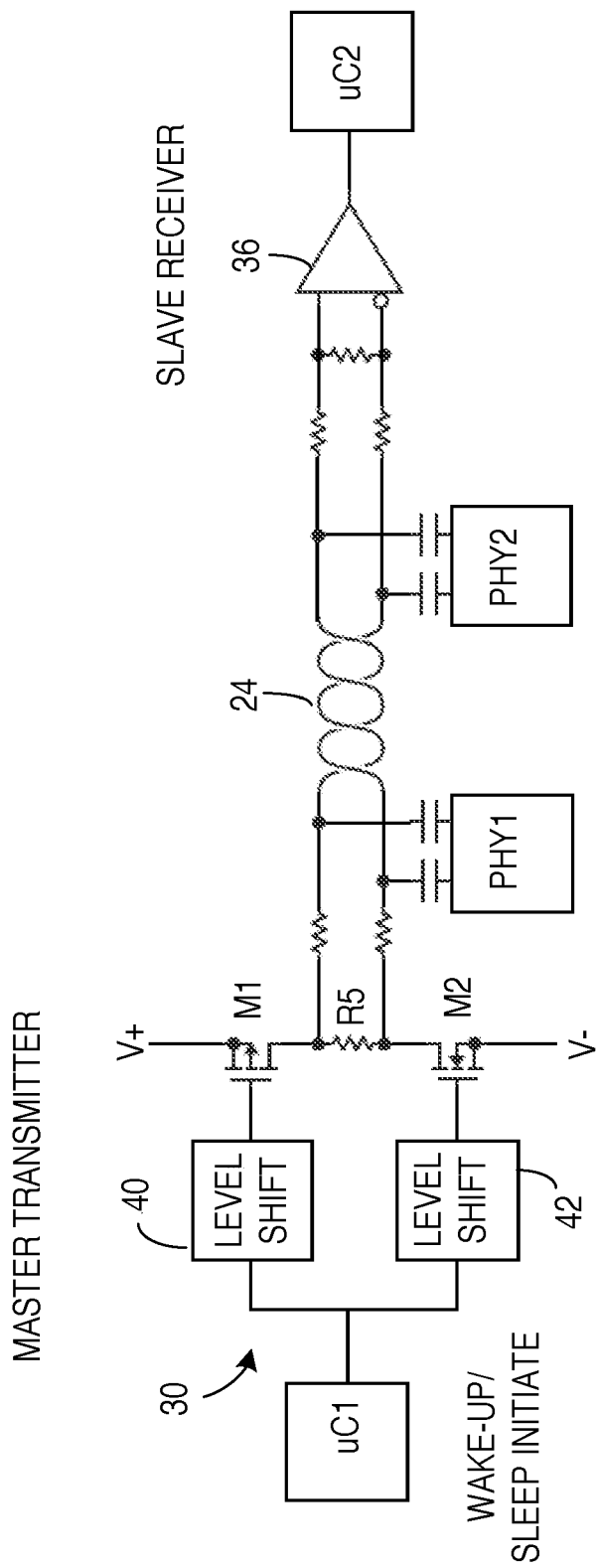
FIG. 3 illustrates a possible master transmitter for the circuit of FIG. 2.

FIG. 3 illustrates a possible type of transmitter 30, where MOSFETs M1 and M2 turn on in the dominant state to couple the DC voltage V+ and −V− to the wire pair 24 and turn off in the recessive state to allow the shunt resistors R5 and R6 to discharge the wire pair 24. Level shifters 40 and 42 appropriately level shift the sleep or wake up control signal from the microcontroller uC1 to control the MOSFETs M1 and M2. Many other types of circuits can be used instead.

Figure 4:
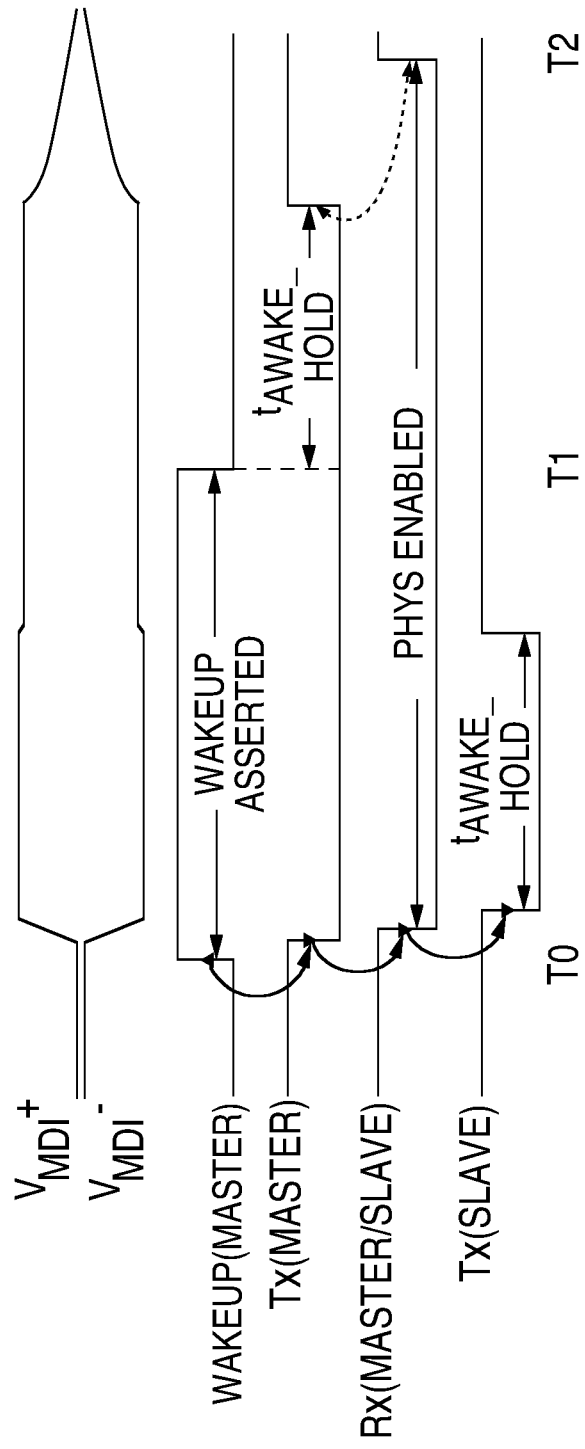
FIG. 4 illustrates highly compressed waveforms showing voltage levels on the wire pair and various outputs of the microcontroller, transmitters, and receivers when the system is waking up from a sleep mode and then going into a sleep mode.

Eventually, a wake up event will occur, such as when it is determined that the system is required to perform an operation. FIG. 4 illustrates various highly compressed waveforms representing the voltages ($V_{MDI+}$ and $V_{MDI-}$) at the Medium Dependent Interface (MDI1 or MDI2) for the wire pair 24 and the logic levels at the various transmitters and receivers.

Prior to time T0, it is assumed the system is in a sleep mode with zero voltage across the wire pair 24 and the transceivers XCVR1 and XCVR2 being in their recessive states. At time T0, the master microcontroller uC1 receives a wake up signal, which signals that the DC voltage (V1+ and V1− in FIG. 2) should be applied to the wire pair. The microcontroller uC1 then controls the transmitter 30 to be in its dominant state so as to apply the DC voltage to the wire pair 24. The master and slave receivers 32 and 36 detect the voltage differential on the wire pair 24 and switch to their dominant states, causing the respective microcontrollers uC1 and uC2 to assert the En1 and En2 signals to apply power to the respective physical layers PHY1 and PHY2 for the data path. The slave transmitter 34 is optionally controlled to be in its dominant state for a short period in response to the received DC voltage.

Between time T0 and T1, the system is operating normally, where DC voltage and differential data are transmitted over the wire pair 24. It is again noted that the transmitted DC voltage is not necessarily used to power either of the end terminals, so the DC power can be low.

At time T1, the wake up signal into terminal 28 of FIG. 2 is deasserted, signifying that a sleep mode is initiated. There is a slight delay before the master transmitter 30 is controlled to be in its recessive state to give the system time to complete any required routines. After the transmitter 30 goes into its recessive state, the resistors R5 and R6 discharge the voltage on the wire pair 24, as shown by the $V_{MDI+}$ and $V_{MDI-}$ waveforms.

A time T2, the voltage differential has gone below a threshold and the receivers 32 and 36 go into their recessive (e.g., off) states and output a high impedance. The master and slave microcontrollers uC1 and uC2 then deassert the En1 and En2 signals to disable the physical layer PHY1 and PHY2 to conserve power.

Figure 5:
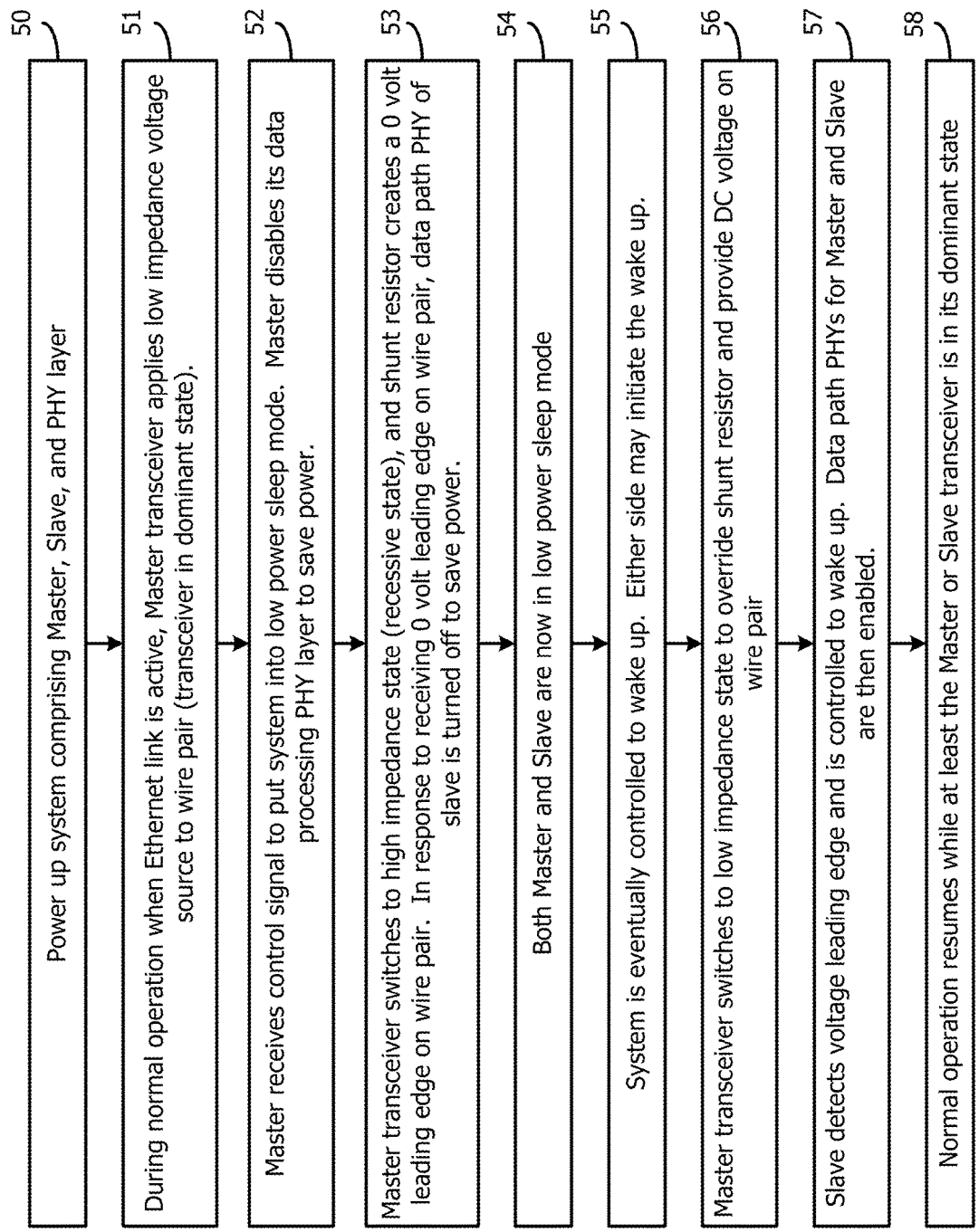
FIG. 5 is a flow chart showing steps used for entering a sleep mode and waking up from the sleep mode.

The self-explanatory flowchart of FIG. 5, comprising steps 50-58, reiterates the basic process discussed above where the sleep mode and awake mode are signaled solely using the DC path rather than the data path. This enables the data path to be disabled during the sleep mode to conserve power.

If one of the transmitters is in a dominant state and the other transmitter is in a recessive state, the contention is resolved, by the processing systems, in favor of the dominant state.

A central electronic control unit (ECU) will typically be part of the system, and this ECU may always be powered for managing the wake up initiation for coming out of sleep mode.

If it is known that one unit will always be a master and the linked unit will always be a slave, there is no need for a receiver in the master if the master microcontroller can disable the master PHY without any feedback from such a receiver. Similarly, if it is known that one unit will always be a master and the linked unit will always be a slave, there is no need for a DC transmitter in the slave. In the example of FIG. 2, the two sides use symmetrical circuitry for simplicity of use.

The communication between the end terminals using only the DC path can be used for any purpose while the PHYs are either enabled or disabled. Pulsed codes may be transmitted using the DC path. In the event of a bus collision between the two DC transmitters, the DC receivers at both ends may detect the discrepancy and force their associated transmitter to delay a transmission in order to arbitrate the bus. Therefore, half-duplex serial communication between the two ends of the link may be realized while the AC-coupled PHYs are disabled.

While particular embodiments of the present invention have been shown and described, it will be obvious to those skilled in the art that changes and modifications may be made without departing from this invention in its broader aspects and, therefore, the appended claims are to encompass within their scope all such changes and modifications.

What is claimed is:

1. A method performed by a system including a master and a slave linked via a wire pair, the master including a first data path and the slave including a second data path coupled to the first data path via the wire pair, the first data path comprising a first transceiver, the second data path comprising a second transceiver, the method comprising:
   operating the system in a first mode of operation, wherein the master and slave are powered and data is transmitted between the master and slave via the first data path and the second data path;
   disabling at least the second transceiver in the slave to disable data transmission via the wire pair in a low power second mode of operation;
   while in the second mode, transmitting a DC voltage by the master on the wire pair signaling to the slave to enable the second transceiver to reenter the first mode of operation; and
   detecting the DC voltage on the wire pair by the slave, transmitted by the master, and, in response, enabling the second transceiver to activate the second data path,
   wherein reentering the first mode is controlled independently of the first data path and the second data path.

2. The method of claim 1 wherein operating the system in the first mode further comprises the master providing a DC voltage across the wires in the wire pair via a first transmitter that is not part of the first data path;
   the method further comprising:
   detecting a first signal by the master indicating that the system is to be placed in the second mode;

upon detecting the first signal, controlling the first transmitter in the master to cease applying the DC voltage to the wire pair;

detecting, by a first receiver in the slave, that the DC voltage has been interrupted and, in response, generating a first initiation signal for the second mode, wherein the first receiver is not part of the second data path;

disabling the second data path in the slave in response to the first initiation signal to conserve power;

detecting a second signal by the master that the system is to be placed in the first mode;

upon detecting the second signal, controlling the first transmitter in the master to apply the DC voltage to the wire pair;

detecting, by the first receiver in the slave, that the DC voltage has been applied to the wire pair and, in response, generating a second initiation signal for the first mode to enable the second data path in the slave, wherein the entering the first mode and the second mode is controlled independently of the first data path and the second data path.

3. The method of claim 2 wherein the step of detecting, by the first receiver in the slave, that the DC voltage has been interrupted and, in response, generating the first initiation signal, comprises the DC voltage on the wire pair being interrupted to signal that the second mode is to occur.

4. The method of claim 1 wherein the step of detecting, by the first receiver in the slave, that the DC voltage has been applied to the wire pair and, in response, generating the second initiation signal, comprises the DC voltage being applied to the wire pair to signal that the first mode is to occur.

5. The method of claim 1 further comprising disabling the first data path in the master to conserve power while in the second mode.

6. The method of claim 1 wherein the second mode is initiated upon detecting that a load current is below a threshold.

7. The method of claim 1 wherein the master and slave are each powered by local DC power sources.

8. A system comprising:

a master and a slave linked via a wire pair, the master including a first data path and the slave including a second data path coupled to the first data path via the wire pair;

the first data path comprising first circuitry and the second data path comprising second circuitry;

a first processing circuit in the master and a second processing circuit in the slave, the first processing circuit and the second processing circuit being programmed to perform the following method:

operating the system in a first mode of operation, wherein the master and slave are powered and data is transmitted between the master and slave via the first data path and the second data path;

disabling at least the second circuitry in the slave to disable data transmission via the wire pair in a low power second mode of operation;

while in the second mode, transmitting a DC voltage by the master on the wire pair signaling to the slave to enable the second circuitry to reenter the first mode of operation; and detecting the DC voltage by the slave, transmitted by the master, and, in response, enabling the second circuitry to activate the second data path, wherein reentering the first mode is controlled independently of the first data path and the second data path.

9. The system of claim 8 wherein operating the system in the first mode further comprises the master providing a DC voltage across the wires in the wire pair via a first transmitter that is not part of the first data path;

the first processing circuit and the second processing circuit being programmed to further perform the following method:

detecting a first signal by the master indicating that the system is to be placed in the second mode;

upon detecting the first signal, controlling the first transmitter in the master to cease applying the DC voltage to the wire pair;

detecting, by a first receiver in the slave, that the DC voltage has been interrupted and, in response, generating a first initiation signal for the second mode, wherein the first receiver is not part of the second data path;

disabling the second data path in the slave in response to the first initiation signal to conserve power;

detecting a second signal by the master that the system is to be placed in the first mode;

upon detecting the second signal, controlling the first transmitter in the master to apply the DC voltage to the wire pair; and detecting, by the first receiver in the slave, that the DC voltage has been applied to the wire pair and, in response, generating a second initiation signal to enable the second data path in the slave, wherein the entering the first mode and the second mode are controlled independently of the first data path and the second data path.

10. The system of claim 9 wherein the step of detecting, by the first receiver in the slave, that the DC voltage has been interrupted and, in response, generating the first initiation signal, comprises the DC voltage being interrupted to signal that the second mode is to occur.

11. The system of claim 9 wherein the step of detecting, by the first receiver in the slave, that the DC voltage has been applied to the at least one wire pair and, in response, generating the second initiation signal, comprises the DC voltage being applied to the wire pair to signal that the first mode is to occur.

12. The system of claim 8 wherein the first processing circuit is further programmed to disable the first circuitry in the first data path in the master to conserve power upon detecting that the system is to be placed in the second mode, and enable the first circuitry during the first mode.

13. The system of claim 8 wherein the second mode is initiated upon detecting that a load current is below a threshold.

14. The system of claim 8 wherein disabling the second data path by the slave comprises the slave turning off a data transceiver.

15. The system of claim 8 wherein the first circuitry and the second circuitry comprise data transceivers coupled to the wire pair via an AC-coupled network.

16. The system of claim 15 wherein the AC-coupled network comprises capacitors coupled to the wire pair.

* * * * *